(No Model.)
S. GIBSON.
DUMPLING STEAMER.
No. 447,678. Patented Mar. 3, 1891.
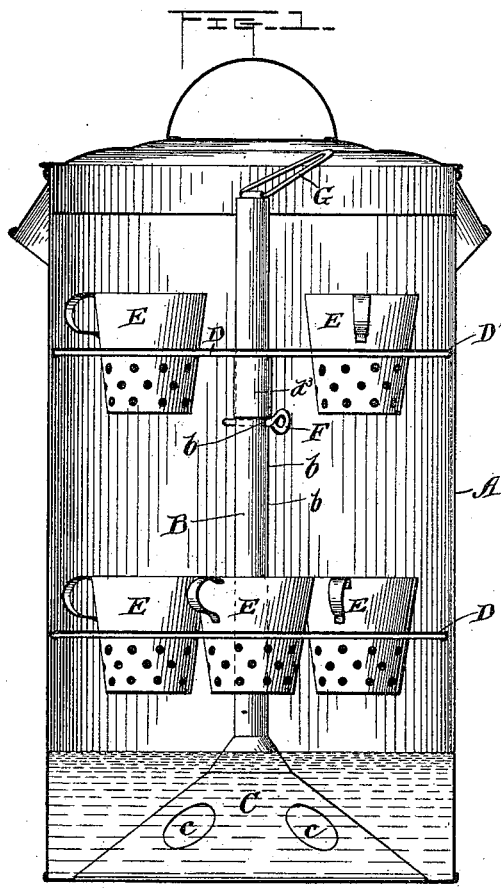
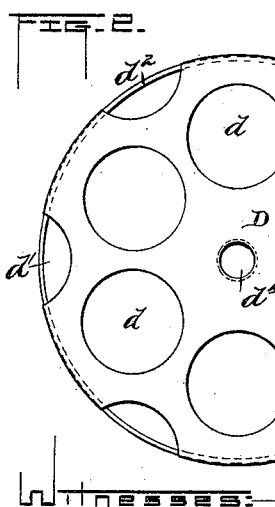
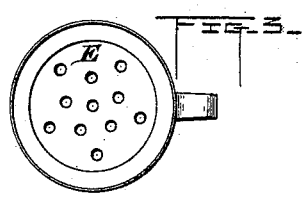
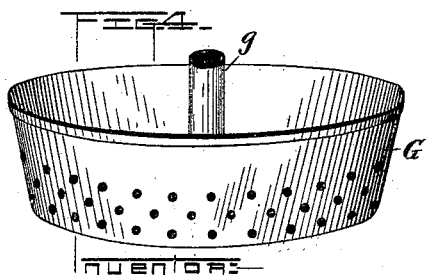
Witnesses:
Severance
H. W. Perry
Inventor:
Susan Gibson
By L. Deane
her Attorney.

UNITED STATES PATENT OFFICE.

SUSAN GIBSON, OF ARKANSAS CITY, KANSAS.

DUMPLING-STEAMER.

SPECIFICATION forming part of Letters Patent No. 447,678, dated March 3, 1891.

Application filed July 12, 1890. Serial No. 358,580. (No model.)

*To all whom it may concern:*

Be it known that I, SUSAN GIBSON, a citizen of the United States, residing at Arkansas City, in the county of Cowley and State of Kansas, have invented certain new and useful Improvements in Dumpling-Steamers; and I do hereby declare the following to be a full, clear, and exact description of the invention, such as will enable others skilled in the art to which it appertains to make and use the same.

Figure 1 is a front view showing the can in section and the inner parts in elevation. Fig. 2 is a top view of one of the perforated shelves. Fig. 3 is a top view of one of the cups. Fig. 4 is a perspective view of a fruit-cake and pudding pan.

The object of the present invention is to provide a cheap and effective device for steaming dumplings or for any like or analogous uses; and the novelty consists in the provision for effecting speedily the heating of the water, for the equal circulation of the steam throughout the device, for the proper adjustment of the shelves with respect to each other, for easily placing the shelves in or removing them from the steamer, and in the structure of the device in detail and as a whole, all as will now be more fully set out and explained, as well as embodied in the claims.

In the drawings, A represents the can or steamer proper, which is of cylindrical form and having, preferably, a flat bottom and is of any suitable height and diameter. Inside this, by means of the stem B, is placed the cone C, said stem being attached to the upper end or apex of the cone. This cone is of about the same diameter on its base with the interior of the can and is open on the bottom and perforated at $c$. Its peculiar use is to form a small chamber on the bottom of the can, within which the water shall be very quickly heated, this result being accomplished by the radiation of the heat from cone back upon the large surface of the bottom of the can. The perforations in the cone allow the heated water in its movements to press upward and so create a circulation of the water and insure its most rapid heating throughout.

Attached to the stem C at a suitable point above the apex of the cone is the perforated shelf D. The round perforations $d$ are for holding the cups E, and the segmental openings or notches $d'$ are for the passage of the steam from the heated water below. These segmental openings or notches, being placed at equal distances apart and entirely around the shelf, allow an equable distribution of the steam up through the shelf, and thus insure the proper distribution of heat throughout the can.

Each of the cups E is perforated at the sides and bottom and has the general shape of a truncated cone, and is of a suitable size to fit into the holes $d$ and to hold a dumpling or other article while being cooked. The perforations allow the freest access of the steam to the sides and bottom of the dumpling, which is also wholly exposed on top.

The edge of the shelf has fixed to it a wire $d^2$, to give it proper firmness and rigidity. Where more than one shelf is used a second shelf D' is placed upon the stem by means of the sleeve $d^3$, attached at its under side and coinciding with the central opening $d^4$ through the shelf. By means of the openings $b$ through the stem above the lower shelf and the pin F through one of these there is formed a suitable support for this collar. Thus the upper shelf or shelves can be adjusted at any desired height relative to the lower shelf and to each other. To enable the stem and parts attached thereto to be easily removed from the can there is provided the handle G at the top. This is in the form of a loop, and in it a hook can be inserted, or when the can is cool the finger. This loop is adapted to be bent down to enable the can-cover to be adjusted in place.

In using this device enough heated or cold water is put into the can so that when the cone, shelves, &c., are in position the water shall come just above the apex of the cone. When heat is applied to the bottom of the can, steam is generated very quickly and the cooking operation is soon accomplished. In practice this device has been found to accomplish the most efficient results. The cheapness of the device and its simplicity of structure also serve to recommend it.

In some instances I may prefer to use a fruit-cake or pudding pan G instead of the upper shelf D', the central tubular stem $g$ of said pan fitting upon the stem B.

I am aware that it is not new, as in egg-cooking boilers, to have a perforated shelf, or one perforated and cut away at the edges, nor to combine with perforated shelves removable vessels having perforated bottoms, nor in cooking-steamers and wash-boilers and like devices to have a hollow cone in the base provided with a hollow pipe for the ascent of steam or water; also, that broadly it is not new to strengthen the edge of thin metal by flanging said portion over itself with or without a wire within the fold thus formed; but my invention differs from all that construction, in that the wire constitutes, in fact, largely the periphery of the shelf, and also protects the edges of the metal between the notches.

I claim as my invention—

1. The combination of the can A with the perforated cone C, the stem B, having handle G, the shelf D, fixed to the stem and perforated at $d$, and having segmental openings or notches $d'$, and another upper shelf D', having adjustable sleeve $d^3$ centrally secured thereto, substantially as and for the purposes described.

2. In combination with the steamer A, the stem B, having the perforated cone C at its lower end and the perforated and notched shelf D on said stem above said cone, and the perforated cups E, fitting in the perforations in the shelf, whereby in use the steam circulates through the said notches and has free access on all sides to the contents of said cups.

In testimony whereof I affix my signature in presence of two witnesses.

SUSAN GIBSON.

Witnesses:
M. L. STAIK,
H. S. THIERS.